United States Patent [19]

Nishikawa et al.

[11] 4,282,200

[45] Aug. 4, 1981

[54] PROCESSES FOR THE PREPARATION OF FIBEROUS TITANIC ACID METAL SALTS

[75] Inventors: Yasuo Nishikawa, Okayamashi; Hiroaki Yanagida, Kashiwashi; Tadao Shimizu, Tachikawashi; Masayosi Hori, Narashinoshi; Tetsuro Yoshida, Okayamashi, all of Japan

[73] Assignee: Kyushu Refractories Co., Ltd., Okayama, Japan

[21] Appl. No.: 124,065

[22] Filed: Feb. 25, 1980

[30] Foreign Application Priority Data

Feb. 26, 1979 [JP] Japan .................................. 54-21563

[51] Int. Cl.$^3$ .............................................. C01G 23/00
[52] U.S. Cl. .................................................... 423/598
[58] Field of Search ......................................... 423/598

[56] References Cited

U.S. PATENT DOCUMENTS

| 2,968,622 | 1/1961 | Whitehurst | 423/598 |
| 3,231,328 | 1/1966 | Pechini | 423/598 |
| 3,509,057 | 4/1970 | Greger | 423/598 |
| 4,179,496 | 12/1979 | Yanagida et al. | 423/598 |

*Primary Examiner*—Herbert T. Carter
*Attorney, Agent, or Firm*—Philip M. Hinderstein

[57] ABSTRACT

Fibrous compounds having a ratio of length to diameter of at least 10 of the formula $MO \cdot TiO_2$ wherein M is a bivalent metal and processes for preparing these compounds are described. Preferably M is selected from the group consisting of barium, strontium, calcium, magnesium, cobalt, lead, zinc, beryllium, and cadmium. The processes for preparing the compounds utilize fibrous potassium titanate hydrates or fibrous titanium dioxide hydrates both having a ratio of length to diameter of at least 10 as the starting material to prepare the compounds.

15 Claims, 1 Drawing Figure

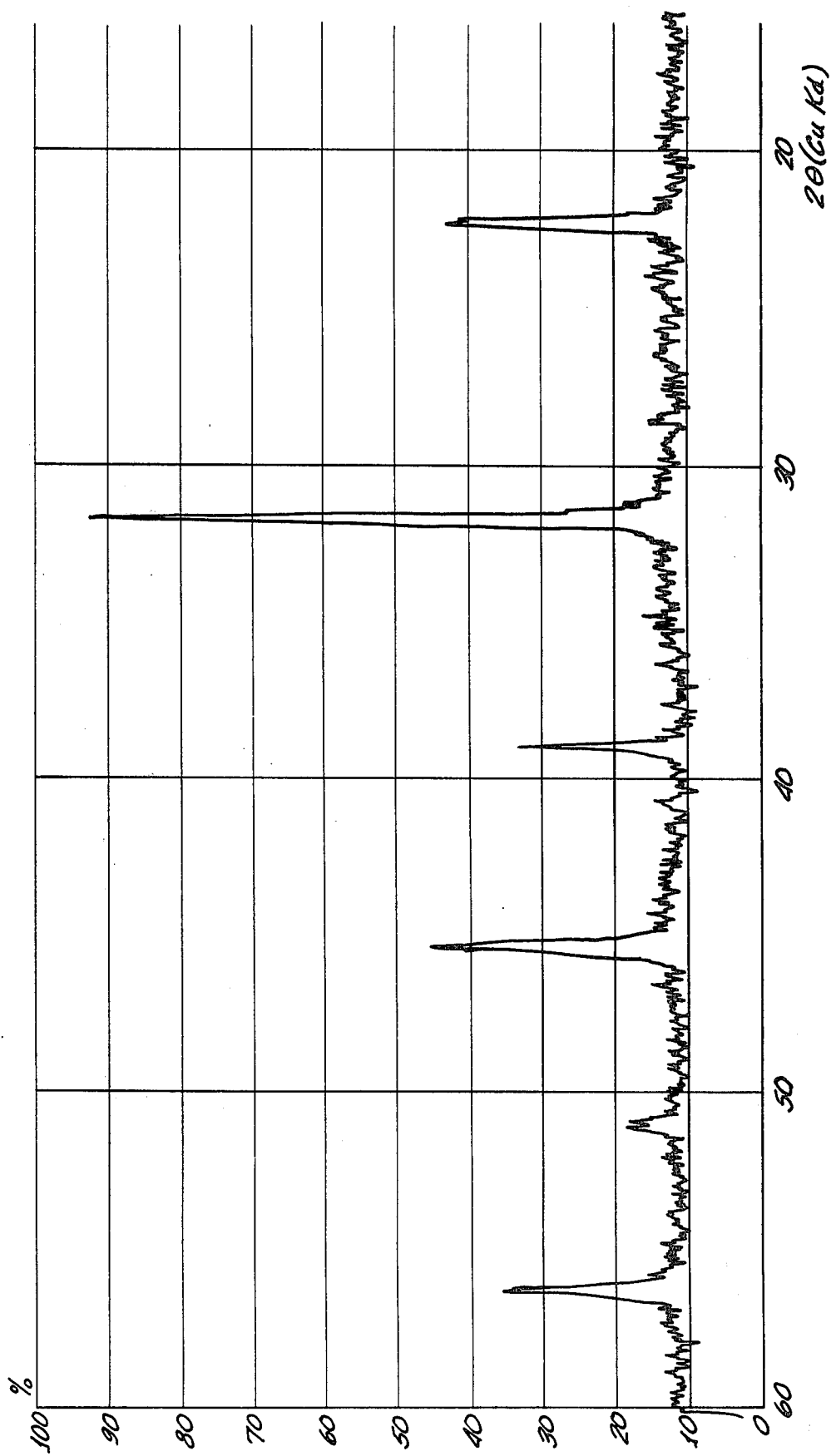

PROCESSES FOR THE PREPARATION OF FIBEROUS TITANIC ACID METAL SALTS

BACKGROUND OF THE INVENTION

Fibrous titanic acid metal salts having a ratio of length to diameter of at least 10 and processes for preparing the same are described.

Bivalent metal salts of titanic acid are known. However, these known salts are not known to exist as fibrous compounds but only as powders or granulated salts. The known powdered or granulated salts include barium titanate, lead titanate, calcium titanate, and strontium titanate. These compounds are useful as the dielectric in capacitors, in ultrasonic vibrators in the form of ceramic piezo-elements, in ceramic filters, and in automatic igniters. Additionally, recently various uses for these compounds have developed in ceramic semiconductors. Because of these uses there is commercial mass production of these compounds for their incorporation as raw ceramic materials.

The prior art process of producing these compounds includes two calcination steps one of which is at temperatures above 1300° C. After calcination, tituration, reblending, and granulation is necessary prior to molding these materials into the final ceramic products. Because these materials are molded as powders or granules the final product produced after a calcination step is prone to cracking. Additionally because these products are molded as powders or granules it is necessary to utilize binders or other special devices to maintain the shapes of the greenware prior to heating of the same.

Titane dioxide compounds are known for their poor scinterability. This poor scinterability is carried forth to the known bivalent metal salts of titanic acid when the titanic acid is prepared from the dioxide compounds by the prior art methods. Molding difficulties are also encountered. Ceramic products prepared using these prior art compounds are prone to having crystal formation within the product being expressed as a random multi-crystal aggregation. The randomness of the crystal thus degrades or destroys any anisotropic characteristics within the final product.

SUMMARY OF THE INVENTION

In view of the above discussion it is a broad object of this invention to prepare bivalent metal salts of titanic acid which are fibrous and have a ratio of length to diameter of at least 10. It is a further object of this invention to prepare barium, strontium, calcium, magnesium, cobalt, lead, zinc, beryllium and cadmium salts of titanic acid having this above fibrous nature and the above noted ratio of length to diameter. It is a further object of this invention to prepare fibrous titanic acid bivalent metal salts which can be arranged to have a fixed crystal direction thus allowing them to achieve anisotropic characteristics close to that of single crystals. It is a further object to prepare bivalent metal salts of titanic acid which because of their fibrous shape with a ratio of length to diameter of at least 10 have improved scinterability and are capable of being scintered at temperatures of about 1000° C.

These and other objects as will become evident in the remainder of this specification are achieved by preparing fibrous compounds having a ratio of length to diameter of at least 10 of the formula $MO \cdot TiO_2$ wherein M is a bivalent metal. M can be selected from the group consisting of barium, strontium, calcium, magnesium, cobalt, lead, zinc, beryllium and cadmium. Preferably M is barium.

The above noted compounds are prepared by one process which includes reacting a compound selected from the group consisting of fibrous potassium titanate hydrate having a ratio of length to diameter of at least 10 of the formula $K_2O \cdot xTiO_2 \cdot yH_2O$ wherein x is 2 to 13 and y is zero to 6 and x and y are not limited to integers and fibrous titanium dioxide hydrate having a ratio of length to diameter of at least 10 of the formula $TiO_2 \cdot zH_2O$ wherein z is less than 5 and z is not limited to integers with an aqueous solution of a bivalent metal ion in a closed vessel under hydrothermal conditions for at least 30 minutes. Further, they are prepared by another process which includes reacting a compound selected from the group consisting of fibrous potassium titanate hydrate having a ratio of length to diameter of at least 10 of the formula $K_2O \cdot xTiO_2 \cdot yH_2O$ wherein x is 2 to 13 and y is zero to 6 and x and y are not limited to integers and fibrous titanium dioxide hydrate having a ratio of length to diameter of at least 10 of the formula $TiO_2 \cdot zH_2O$ wherein z is less than 5 and z is not limited to integers with an aqueous solution containing a bivalent metal ion at ambient atmospheric pressure at a temperature from about room temperature to the boiling point of the aqueous solution for at least 30 minutes and collecting the fibrous intermediate and heating the intermediate at a temperature from about 400° C. to a temperature below the fusing temperature of the intermediate and collecting the fibrous compound.

BRIEF DESCRIPTION OF THE DRAWING

The FIGURE shows the X-ray diffraction pattern (Cu K α-ray) of powders of barium titanate fibers prepared according to the invention.

DETAILED DESCRIPTION

In U.S. Pat. No. 4,179,496 assigned to the same assignee as this patent application certain potassium titanate hydrate fibers are described. These potassium titanate hydrate fibers were prepared by treating potassium titanate anhydride fibers by calcination. The anhydride fibers are described in Japanese patent application Nos. 53-32406, 53-26298, and 53-28100. In addition to the above noted United States patent, Japanese patent application Nos. 53-139826 and 53-137462 describe the process of treating the anhydride fibers with water or acids to yield the noted potassium titanate hydrate fibers. Further reaction of the hydrate fibers to anatase or rutile type fibrous compounds by hydrothermal treatment is described in Japanese patent application Nos. 53-28099, 53-41518, and 53-52737.

As starting materials for the compounds of this invention produced by the processes of this invention there are preferably employed fibers of potassium titanate hydrate of the formula $K_2O \cdot xTiO_2 \cdot yH_2O$ wherein x has a value of 2 to 13 and y has a value of zero to 6 and both x and y need not necessarily be integers and the fibers have a ratio of length to diameter of at least 10 or fibers of titane dioxide hydrate of the formula $TiO_2 \cdot zH_2O$ wherein z is five or less but is not necessarily an integer and the fibers have a ratio of length to diameter of at least 10. The fibrous titane dioxide hydrate is obtained by acid treatment of the fibrous potassium titanate hydrate.

The above noted starting materials are converted to the bivalent metal salts of titanic acid of the invention by either hydrothermal treatment at elevated pressures in an autoclave or the like in the presence of an aqueous solution of a bivalent metal ion or reflexing in aqueous solution containing bivalent metal ions followed by calcination. In the first noted process the titanic acid metal salts of the invention are produced directly from the pressure reaction.

As a starting material for the bivalent metal ion, bivalent metal ion salts which are soluble in water at room temperature are preferred. However, other insoluble salts (at room temperature) may be used. To facilitate the use of these other salts solubility is increased by the addition of complex salt forming agents or chelating agents such as potassium hydroxide, potassium cyanide, or ethylene diaminetetraacetate (EDTA).

For the pressurized process for producing the compounds of the invention the reaction is conducted under elevated pressure in a closed vessel under hydrothermal conditions at a temperature from about room temperature to about 600° C. Preferably the temperature would be from about 100° to 500° C. The reaction is conducted for at least 30 minutes and the titanic acid metal salts of the invention are obtained directly from this pressurized reaction.

The alternate preparation of the bivalent metal salts of the invention is conducted at ambient atmospheric pressure in an aqueous solution from ambient temperature to the boiling point of the aqueous solution. The reaction is run for a period of time greater than 30 minutes and then the intermediate or precursor of the fibrous titanic acid metal salts is collected by filtration and then subject to thermal treatment at a temperature from about 400° C. to a temperature below the fusing temperature of the reaction media. Preferably this temperature will be from about 500° to about 1100° C.

The titanic acid metal salts produced by either of the above processes are in the form of long fibers or whiskers with a ratio of length to diameter of at least 10. Normally this ratio of length to diameter is of the order of 40 to 50. Greater ratios of at least 500 are also obtained. After either of the above noted processes the titanic acid metal salts are maintained in their fibrous form. Because of this fibrous form with a ratio of length to diameter of at least 10 the scinterability of the titanic acid metal salts for use in preparing ceramics is greatly improved. Further, the fibrous shape of the titanic acid metal salts allows for the preparation of a ceramic product therefrom at a relatively low scintering temperature of around 1000° C. The fibrous nature of the compounds of this invention improve the ceramics prepared therefrom by decreasing the susceptibility of said ceramic to cracking as well as improve molding and other forming techniques of preparing the green ceramic.

The fibrous nature of the compounds of this invention is useful because the fibers are susceptible to becoming tangled together which adhere them and other agents in a mass during molding. This tangling or adhesion of the fibers allows for the deletion of bonding agents during the molding.

Because the products of this invention are fibrous the fibers can be arranged to have a fixed crystal direction.

The following representative examples illustrate the preparation of representative examples of the compounds of this invention as produced by either of the processes of the invention. The compounds of the invention are not to be construed as being limited to the exact representative compounds of these examples but are to be construed in light of the claims.

EXAMPLE 1

To a mixture of 2.0 kg. of powdered titane dioxide and 1.1 kg. of powdered anhydrous potassium carbonate was added 800 ml. of water. The mixture was well kneaded, dried at 80° C. for 48 hours and calcinated at 1000° C. for 24 hours. After cooling, the product was added to 4 liters of water and stirred to obtain a suspension of fibrous substance. The fibers were collected by filtration, washing and dried at 60° C. to yield 1.8 kg. of fibrous potassium titanate hydrate of the formula $2K_2O.11TiO_2.3H_2O$ with a ratio of length to diameter of the fibers being at least 10.

EXAMPLE 2

In a 23 ml-Moley autoclave were placed 2.0 g. of fibrous potassium titanate hydrate obtained as per Example 1. 4.4 g of barium hydroxide and 12.0 ml. of water. The mixture was maintained at 500° C. for 20 hours. After completion of the reaction, the autoclave was cooled quickly and the product filtered, washed with water and dried at 80° C. for 24 hours. The reaction yielded 3.0 g. of product which according to X-ray diffraction was composed of only barium titanate. The product was microscopicly observed to reveal that it retained completely the fibrous shape of the starting potassium titanate hydrate fibers. The X-ray diffraction pattern of powers of this barium titanate fibrous product is shown as the FIGURE in the drawing.

EXAMPLE 3

According to the same procedure as in Example 2, 2.0 g. of fibrous potassium titanate hydrate was reacted with 2.2 g. of barium hydroxide and 13.0 ml. of water at 150° C. for 5 hours in an autoclave. The fibrous substance contained comprised mainly barium titanate which retains completely the fibrous shape of the starting potassium titanate hydrate fibers.

EXAMPLE 4

2.0 g. of fibrous potassium titanate hydrate obtained as per example 1 was refluxed with 63.1 g. of barium hydroxide and 170 ml. of water for 3 hours. After filtration, the intermediate product was calcinated at 1000° C. for an hour, washed with 0.1 mol/l. nitric acid and calcinated again at 1000° C. for an additional hour. The calcination yielded 2.2 g. of product which comprised fibrous barium titanate retaining completely the fibrous shape of the starting potassium titanate hydrate fibers mixed with a small amount of fibrous titane dioxide.

EXAMPLE 5

Fibrous potassium titanate hydrate was treated with hydrochloric acid to obtain titane dioxide hydrate fibers retaining completely the fibrous shape. 2.0 g. of these titane dioxide hydrate fibers were refluxed following the same procedure as in Example 4. The supernatant was discarded and equal amounts of barium hydroxide and water were newly added to the residue and the reaction refluxed again. This operation was repeated four times. The resulting product was calcinated and treated with an acid as in Example 4 to obtain 3.4 g. of barium titanate fibers retaining completely the fibrous shape of the starting titane dioxide hydrate fibers.

EXAMPLE 6

According to the same procedure as in Example 2, 2.0 g. of fibrous potassium titanate hydrate was reacted with 3.7 g. of strontium hydroxide and 12 ml. of water at 500° C. for 2.0 hours in an autoclave to obtain 3 g. of fibrous product which comprises mainly strontium titanate retaining completely the fibrous shape of the starting potassium titanate hydrate fibers mixed with potassium hexatitanate.

EXAMPLE 7

According to the same procedure as in Example 6, but replacing strontium hydroxide with 1.0 g. of calcium hydroxide, there was obtained a fibrous product comprising mainly calcium hydroxide which completely retained the fibrous shape of the starting potassium titanate hydrate fibers.

We claim:

1. A process for preparing fibrous compounds having a ratio of length to diameter of at least 10 of the formula $$MO \cdot TiO_2$$

wherein M is a bivalent metal selected from the group consisting of barium, strontium, calcium, magnesium, cobalt, lead, zinc, beryllium, and cadmium which comprises:
reacting a compound selected from the group consisting of fibrous potassium titanate hydrate having a ratio of length to diameter of at least 10 of the formula $$K_2O \cdot xTiO_2 \cdot yH_2O$$

wherein x is 2 to 13 and y is zero to 6 and x and y are not limited to integers and fibrous titanium dioxide hydrate having a ratio of length to diameter of at least 10 of the formula $$TiO_2 \cdot zH_2O$$

wherein z is less than 5 and z is not limited to integers with an aqueous solution of a bivalent metal ion in a closed vessel under hydrothermal conditions for at least 30 minutes.

2. The process of claim 1 wherein M is an alkaline earth metal.

3. The process of claim 1 wherein M is barium, calcium or beryllium.

4. The process of claim 2 wherein:
said hydrothermal conditions are conducted at a temperature from room temperature to 600° C.

5. The process of claim 4 wherein:
said temperature is from about 100° C. to about 550° C.

6. The process of claim 5 wherein M is an alkaline earth metal.

7. A process for preparing fibrous compounds having a ratio of length to diameter of at least 10 of the formula $$MO \cdot TiO_2$$

wherein M is barium which comprises:
reacting a compound selected from the group consisting of fibrous potassium titanate hydrate having a ratio of length to diameter of at least 10 of the formula $$K_2O \cdot xTiO_2 \cdot yH_2O$$

wherein x is 2 to 13 and y is zero to 6 and x and y are not limited to integers and fibrous titanium dioxide hydrate having a ratio of length to diameter of at least 10 of the formula $$TiO_2 \cdot zH_2O$$

wherein z is less than 5 and z is not limited to integers with an aqueous solution of barium ions in a closed vessel under hydrothermal conditions for at least 30 minutes, and
said hydrothermal conditions are conducted at a temperature from about 100° C. to about 550° C.

8. The process of claim 7 wherein:
x is equal to 11 and y is equal to 3.

9. A process for preparing fibrous compounds having a ratio of length to diameter of at least 10 of the formula $$MO \cdot TiO_2$$

wherein M is a bivalent metal selected from the group consisting of barium, strontium, calcium, magnesium, cobalt, lead, zinc, beryllium, and cadmium which comprises:
reacting a compound selected from the group consisting of fibrous potassium titanate hydrate having a ratio of length to diameter of at least 10 of the formula $$K_2O \cdot xTiO_2 \cdot yH_2O$$

wherein x is 2 to 13 and y is zero to 6 and x and y are not limited to integers and fibrous titanium dioxide hydrate having a ratio of length to diameter of at least 10 of the formula $$TiO_2 \cdot zH_2O$$

wherein z is less than 5 and z is not limited to integers with an aqueous solution containing a bivalent metal ion at ambient atmospheric pressure at a temperature from about room temperature to the boiling point of the aqueous solution for at least 30 minutes and collecting the fibrous intermediate and heating the intermediate at a temperature from about 400° C. to a temperature below the fusing temperature of the intermediate and collecting the fibrous compound.

10. The process of claim 9 wherein:
said intermediate is heated at a temperature of from about 500° C. to 1100° C.

11. The process of claim 10 wherein:
said intermediate is heated for at least one hour.

12. The process of claim 11 wherein:
said heating said intermediate is interrupted and the intermediate is washed with an aqueous acid and said heating step is continued.

13. The process of claim 12 wherein M is an alkaline earth metal.

14. The process of claim 10 wherein M is an alkaline earth metal.

15. The process of claim 10 wherein M is barium, calcium or beryllium.

* * * * *